United States Patent Office 3,590,056
Patented June 29, 1971

3,590,056
LOW MOLECULAR WEIGHT THIODIPROPIONIC POLYESTERS
Clarence T. Tholstrup, Alan Bell, and Charles J. Kibler, Kingsport, Tenn., assignors to Eastman Kodak Company, Rochester, N.Y.
No Drawing. Continuation-in-part of application Ser. No. 513,593, Dec. 13, 1965, now Patent No. 3,466,323, which is a continuation-in-part of applications Ser. No. 77,862, Dec. 23, 1960, now Patent No. 3,157,517, and Ser. No. 309,339, Sept. 16, 1963. This application Sept. 8, 1969, Ser. No. 856,146
Int. Cl. C07c *69/78, 149/20*
U.S. Cl. 260—399                                        8 Claims

ABSTRACT OF THE DISCLOSURE

Low molecular weight polyesters useful as stabilizers for organic materials and prepared by condensing a thiodipropionic acid or ester thereof with a diprimary sterically hindered glycol with or without a chain terminating agent.

---

This application is a continuation-in-part of our copending U.S. application Ser. No. 513,593, now U.S. Pat. No. 3,466,323 granted Sept. 9, 1969, filed Dec. 13, 1965, which in turn is a continuation-in-part of our U.S. applications Ser. No. 309,339 (now abandoned), filed Sept. 16, 1963; and Ser. No. 77,862 (now U.S. Pat. No. 3,157,- 517), filed Dec. 23, 1960.

This invention relates to novel low molecular weight linear polyesters of thiodipropionic acid condensed with a diprimary sterically hindered glycol, which polyesters can be optionally unterminated or terminated with a monofunctional alcohol or carboxylic acid. These polyesters are superior stabilizers (antioxidants) for organic materials subject to oxidative and other types of deterioration.

It is an object of this invention to provide novel polyesters which are useful as antioxidants in normally oxidizable organic materials. It is a further object to provide novel polyesters which can be employed both as plasticizers and as antioxidants in synthetic resins. It is another object to provide novel polyesters which when used together with phenolic antioxidants, are effective as stabilizers in organic materials, and in fact, cause a cumulative or synergistic antioxidant effect which is substantially more than the sum of the antioxidant effect of each when used separately.

It is accordingly an object of this invention to provide a new class of antioxidants which are useful for other purposes, besides being antioxidants, such as being useful as plasticizers whereby a surprisingly valuable dual function can be achieved.

Other objects will become apparent hereinafter.

The novel complex polyesters of this invention are characterized by a lower molecular weight than that of the so-called polythioesters. For best results, the molecular weight should be no greater than about 4,000. The complex polyesters can be prepared by reacting 3,3'-thiodipropionic acid or its esters with diprimary sterically hindered glycols and, optionally, with monobasic acids or alcohols.

Suitable diprimary sterically hindered glycols that can be employed in the preparation of the polyesters of the invention are selected from the group consisting of neopentyl glycol; 2,2-diethylpropanediol-1,3; 2-ethyl-2-butylpropanediol-1,3; 2-ethyl-2-propylpropanediol-1,3; 2-ethyl-2-methylpropanediol-1,3; 1,1 - cyclohexanedimethanol; 1,2-cyclohexanedimethanol; 1,3 - cyclohexanedimethanol; and 1,4-cyclohexanedimethanol.

Of these, the preferred glycols are those selected from the group consisting of 1,1-cyclohexanedimethanol; 1,2-cyclohexanedimethanol; 1,3-cyclohexanedimethanol; and 1,4-cyclohexanedimethanol, since polyesters prepared from these glycols have been found to be the most effective stabilizers.

Diprimary sterically hindered glycols are used to prepare the polyesters of the invention since they have better thermal and hydrolytic stability than polyesters prepared from other glycols. Hydrolytic stability is an important property in a stabilizer since if a material hydrolyzes, then it could be lost through leaching or volatilization and thus become an ineffective stabilizer. Thermal stability is an important property in a stabilizer since many polymer fabrication steps involve heat and a material which degrades upon heating is an ineffective stabilizer.

Polyesters prepared from neopentyl glycol and thiodibutyric acid are shown in British Patent 588,833. However, polyesters of thiodibutyric acid are inffective stabilizers as will be shown hereinafter, and polyesters prepared from thiodipropionic acid are vastly superior which is a surprising and unexpected result.

Methods for making the complex polyesters of this invention are well known. For exampe, $n$ moles of the thiodipropionic acid or ester thereof can be reacted with $n+1$ moles of a diprimary sterically hindered glycol (where $n$ is an integer greater than 1) using any of the ester interchange catalysts known to the art. Of course, the ratio of reactants can be altered to produce complex polyesters of various molecular weights.

To produce the novel low molecular weight complex polyesters of the invention, an appropriate chain-terminating agent can be used, for example, a monobasic carboxylic acid, its ester or anhydride, or a monohydric alcohol or substituted alcohol. Examples of alcohols which may be so used are methanol; ethanol; butanol; isobutanol; 2-ethylhexanol; 2,2-dimethylpentanol; 2,2,4-trimethylpentanol; stearyl alcohol; etc. Examples of acids which can be used in a similar manner as acids or in their anhydride form are acetic acid, butyric acid, isobutyric acid, lauric acid, oleic acid, stearic acid, pelargonic acid, benzoic acid, etc.

Altthough in many cases it may be preferable to terminate the polyesters of this invention with monofunctional alcohols or acids, the unterminated polyesters are also useful and are within the scope of this invention. Polyesters which are at least 50% terminated have been found to be easily produced in commercial quantities and are substantially equivalent in properties to fully terminated polyesters.

Complex polyesters of the desired molecular weight can be obtained by varying the conditions of the reaction and the amounts of the reactants as is more specifically illustrated by the examples given hereinafter.

Specific organic materials which can be stabilized with the antioxidants of this invention include fatty oils and fats such as lard, waxes, cottonseed oil, corn oil, peanut oil and citrus oils, fatty acids, glycerides, vitamin compositions and the like. See U.S. Pat. No. 3,157,517 which discloses the stabilization of fats, fatty oils and related substances.

Other materials which can be stabilized include synthetic and natural resins, cellulose esters, hyddrocarbons including waxes, oils and fuels, polymeric compositions whether resinous or not, etc. See for example our Ser. No. 77,863, filed Dec. 23, 1960, now abandoned, which relates to stabilizing poly-alpha-olefins. Refer also to Kibler et al. U.S. Pat. 3,233,176 which describes, as stabilizers in elastomeric polymers, the employment of polyesters of the type defined herein. Reference is also invited to Bell et al. U.S. Pat. 3,277,060 as regards using the polyesters of the present invention to facilitate the manufacture of resinous polyesters.

The preparation of typical compounds and compositions embodying this invention is illustrated by the following examples. Others which come within the scope of the invention can be prepared in a similar manner, and it is not intended that the invention should be limited to these specific compounds and compositions set forth in the following examples which are provided for purposes of illustration.

EXAMPLE 1

Preparation of polyester of 3,3′-thiodipropionic acid and neopentyl glycol, molecular weight 669

A mixture of 267 g. (1.5 moles) of 3,3′-thiodipropionic acid, 96.7 g. (0.93 mole) of neopentyl glycol and 201 g. (1.73 moles) of 2,2-dimethylpentanol containing 0.4 ml. of titanium tetraisopropoxide was placed in a two-liter, three-necked flask. The flask was fitted with a stirrer and a two-feet packed column terminating in a vacuum still head and receiver. The mixture was heated with stirring under the conditions given in the following table:

| Time, hr.: | Temp., °C. | Pressure, mm. Hg | Water collected, ml. | Acid No. |
|---|---|---|---|---|
| 8 | 124–150 | 200 | 38 | |
| 14 | 150–170 | 200–95 | 53.5 | 30.3 |
| 38 | 170 | 95 | ¹ 55 | 0.28 |
| 66 | 170 | 82 | | 0.25 |
| 90 | 170 | 1.0 | | |

¹ 3 moles.

As water was formed, it was removed by distillation and collected in the receiver. After the acid number had reached 0.25, the column was removed, the pressure was dropped to 1 mm., and the excess 2,2-dimethylpentanol and any other volatiles were removed by distillation.

The light colored liquid was cooled, and 5 g. of a diatomaceous silica filter aid and 50 ml. of water were added. This was refluxed for 3 hours with stirring to convert the titanium alkoxide catalyst to inert $TiO_2$. The mixture was filtered by suction to remove the $TiO_2$ and filter aid and the filtrate dried at 110° C. under vacuum. The polyester had a molecular weight of 669, determined by the boiling point elevation in benzene.

EXAMPLE 2

Preparation of polyester of 3,3′-thiodipropionic acid and neopentyl glycol, molecular weight 1,106

A polyester was prepared by the procedure of Example 1 above except that the ratios of reactants were altered to permit the formation of a product of higher molecular weight. 267 g. (1.5 moles) of 3,3′-thiodipropionic acid, 125 g. (1.2 moles) of neopentyl glycol and 139 g. (1.2 moles) of 2,2-dimethylpentanol were used. The molecular weight of the liquid polyester was 1.106.

EXAMPLE 3

Preparation of polyester of 3,3′-thiodipropionic acid and neopentyl glycol, molecular weight 1,445

A polyester was prepared in accordance with Example 1 with the exception that the proportions of the reactants were altered to obtain a product of a still higher molecular weight. 1.5 moles of 3,3′-thiodipropionic acid, 1.5 moles of neopentyl glycol, and 0.6 mole of 2,2-dimethylpentanol were used. The viscous liquid produced had a molecular weight of 1,445.

EXAMPLE 4

Preparation of polyester of 3,3′-thiodipropionic acid and 1,4-cyclohexanedimethanol, molecular weight 767

A polyester was prepared by the procedure of Example 1 except that 267 g. (1.5 moles) of thiodipropionic acid, 134 g. (0.93 mole) of 1,4-cyclohexanedimethanol and 225 g. (1.73 moles) of 2-ethylhexanol were used. In this case 4.0 ml. of a 10% solution of

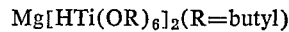

in butanol was used as catalyst. The product was a clear yellow viscous oil of molecular weight 767. It had an acid number of 0.10 and a hydroxyl number of 1.13.

EXAMPLE 5

Preparation of polyester from 3,3′-thiodipropionic acid, 1,4-cyclohexanedimethanol and stearyl alcohol This polyester with a molecular weight of about 2000 was prepared by refluxing a mixture of 5.0 moles (890 g.) of 3,3′-thiodipropionic acid, 5.0 moles (720 g.) of 1,4-cyclohexanedimethanol (70% trans), 1 mole (270 g.) stearyl alcohol, 250 ml. of xylene and 2.0 ml. of titanium isopropoxide under nitrogen about 16 hours. During this time the reaction mixture was stirred. At the end of this time the acid number was 0.14. To the mixture was then added 50 g. of silica filter aid, 20 g. of activated charcoal, 100 ml. of water and 1 liter of xylene. This mixture was stirred and refluxed for 1 hour and was then filtered through silica filter aid. The solvent was stripped under vacuum to a final base temperature of 150–160° C. at 2 mm. to give about 1500 g. of soft sticky wax, M.W. 1900–2100.

EXAMPLE 6

Preparation of polyester of 3,3′-thiodipropionic acid, 1,4-cyclohexanedimethanol and tridecyl alcohol, molecular weight 1200

A mixture of 89 g. (0.5 mole) of 3,3′-thiodipropionic acid, 72 g. (0.5 mole) of 1,4-cyclohexanedimethanol, 40 g. (0.2 mole) of tridecyl alcohol, 70 ml. of xylene and 0.2 ml. of titanium isopropoxide was placed in a flask fitted with a stirrer, a thermometer and a water separator. This mixture was stirred and heated at 146–151° C. under nitrogen for 7 hours. After cooling, the mixture was diluted with 100 ml. of toluene and to this was added 5 g. of Filter-Cel filtering aid, 5 g. of Darco G-60 carbon black and 30 ml. of water. This mixture was boiled for 1 hour, filtered while hot and the filtrate was stripped under vacuum to a final temperature of 150° C. at 1 mm. pressure. The resulting white soft waxy polymer had a M.W. of 1200, an acid number of 0.21 and a hydroxyl analysis of 1.58%.

EXAMPLE 7

Preparation of polyester of 3,3′-thiodipropionic acid, 1,4-cyclohexanedimethanol and stearyl alcohol, molecular weight 2200

A polymer was prepared from 89 g. (0.5 mole) of 3,3′-thiodipropionic acid, 72 g. (0.5 mole) of 1,4-cyclohexanedimethanol and 27 g. (0.1 mole) of stearyl alcohol using the procedure of Example 6. The white waxy polymer had a M.W. of 2200, an acid number of 0.52 and a hydroxyl analysis of 1.09%.

EXAMPLE 8

Preparation of polyester of 3,3′-thiodipropionic acid, 1,4-cyclohexanedimethanol and stearyl alcohol, molecular weight 2700

Using the procedure described in Example 6, a polyester was prepared from 78.5 g. (0.44 mole) of 3,3′-thiodipropionic acid, 63.5 g. (0.44 mole) of 1,4-cyclohexanedimethanol and 13.5 g. (0.05 mole) of stearyl alcohol. The white waxy polymer had a M.W. of 2700, an acid number of 0.40, and a hydroxyl analysis of 0.92%.

EXAMPLE 9

Preparation of fully terminated polyesters of 3,3′-thiodipropionic acid, 1,4-cyclohexanedimethanol and stearyl alcohol, molecular weight 1900

A polymer was prepared as in Example 6, except using a reaction time of 40 hours, from 133.5 g. (0.75 mole) of 3,3′-thiodipropionic acid, 89 g. (0.62 mole) of 1,4-cyclohexanedimethanol and 67.5 g. (0.25 mole) of stearyl alcohol. The resulting white waxy polymer had a M.W. of 1900, an acid number of less than 0.1. No hydroxyl termination could be detected.

EXAMPLE 10

Preparation of polyester of 3,3'-thiodipropionic acid, 1,3-cyclohexanedimethanol and stearyl alcohol molecular weight 1500

Using the same procedure as in Example 6, a polyester was prepared from 44.5 g. (0.25 mole) of 3,3'-thiodipropionic acid, 32.5 g. (0.22 mole) of 1,3-cyclohexanedimethanol and 27 g. (0.1 mole) of stearyl alcohol. The resulting white waxy polymer had a M.W. of 1500, an acid number of 0.43, and a hydroxyl analysis of 1.65%.

EXAMPLE 11

Preparation of polyester of 3,3'-thiodipropionic acid, 1,2-cyclohexanedimethanol and stearyl alcohol molecular weight 1450

Using the procedure of Example 6, a polyester was prepared from 44.5 g. (0.25 mole) of 3,3'-thiodipropionic acid, 32.5 g. (0.22 mole) of 1,2-cyclohexanedimethanol and 27 g. (0.1 mole) of stearyl alcohol. The resulting white waxy solid had a M.W. of 1450, an acid number of 0.82 and a hydroxyl analysis of 1.71%.

EXAMPLE 12

Preparation of polyester of 3,3'-thiodipropionic acid, 1,1-cyclohexanedimethanol, and stearyl alcohol, molecular weight 1600

A polymer was prepared from 44.5 g. (0.25 mole) of 3,3'-thiodipropionic acid, 32.5 g. (0.25 mole) of 1,1-cyclohexanedimethanol and 27 g. (0.1 mole) of stearyl alcohol using the procedure of Example 6. The polyester was obtained as a white waxy polymer having a M.W. of 1600, an acid number of 0.67 and a hydroxyl analysis of 1.61%.

EXAMPLE 13

Preparation of polyester of 3,3'-thiodipropionic acid, 2-butyl-2-ethyl-1,3-propanediol and stearyl alcohol, molecular weight 1100

A polyester was prepared from 89 g. (0.5 mole) of 3,3'-thiodipropionic acid, 80 g. (0.5 mole) of 2-butyl-2-ethyl-1,3-propanediol and 54 g. (0.2 mole) of stearyl alcohol using the procedure of Example 6, except that the heating time was increased to 20 hours. The resulting white waxy polymer had a M.W. of 1100, an acid number of 0.43 and a hydroxyl analysis of 1.76%.

EXAMPLE 14

Preparation of polyester of 3,3'-thiodipropionic acid, 2-ethyl-2-propyl-1,3-propanediol and stearyl alcohol, molecular weight 1550

Using the same procedure as Example 13, a polyester was prepared from 44.5 g. (0.5 mole) of 3,3'-thiodipropionic acid, 30 g. (0.22 mole) of 2-ethyl-2-propyl-1,3-propanediol and 27 g. (0.1 mole) of stearyl alcohol. The resulting polyester was a white waxy solid, M.W. of 1550, acid number 0.55, and hydroxyl analysis 1.75%.

EXAMPLE 15

Preparation of polyesters of 3,3'-thiodipropionic acid, 2-ethyl-2-methyl-1,3-propanediol and stearyl alcohol, molecular weight 2300

A polyester was prepared as in the procedure of Example 13 using 89 g. (0.5 mole) of 3,3'-thiodipropionic acid, 59 g. (0.5 mole) of 2-ethyl-2-methyl-1,3-propanediol and 27 g. (0.1 mole) of stearyl alcohol. The white waxy polyester had a M.W. of 2300, an acid number of 0.45 and a hydroxyl analysis of 1.01%.

To show the superiority of polyesters prepared from 3,3'-thiodipropionic acid over 4,4'-thiodibutyric acid, the following polyester was prepared:

EXAMPLE 16

Preparation of polyester of 4,4'-thiodibutyric acid, 1,4-cyclohexanedimethanol and stearyl alcohol, molecular weight 1400

A polyester was prepared from 51.5 g. (0.25 mole) of 4,4'-thiodibutyric acid, 32.5 g. (0.25 mole) of 1,4-cyclohexanedimethanol and 27 g. (0.1 mole) of stearyl alcohol, using the procedure of Example 6. The resulting polymer was a soft white wax, M.W. 1400, acid number 0.35, and hydroxy analysis 1.77%.

Data is presented in the following table which shows that polyesters prepared from 3,3'-thiodipropionic acid are superior to polyesters prepared from 4,4'-thiodibutyric acid.

TABLE I

| Test: | Polypropylene plus the following additives | 160° C. oven life (hrs.) |
|---|---|---|
| 1 | None | <0.5 |
| 2 | 0.1% Santowhite powder[1] plus 0.1% polyester of Example 7, M.W. 2,200. | 250 |
| 3 | 0.1% Santowhite powder plus 0.1% polyester of Example 16, M.W. 1,400. | 40 |

[1] 4,4'-butylidene bis(6-tert-butyl-m-cresol).

From the data in the table, it is readily seen that polyesters from 3,3'-thiodipropionic acid have a thermal stability of over six times that of polyesters of 4,4'-thiodibutyric acid.

As mentioned hereinbefore, the unterminated and/or partially terminated polyesters are useful as stabilizers for organic materials and are within the scope of this invention. Polyesters which are unterminated or only partially terminated with monofunctional alcohols, acids or other added terminators can be easily produced in commercial quantities in a known manner. The following examples illustrate such unterminated or partially terminated polyesters and certain preferred methods by which they may be produced.

EXAMPLE 17

Preparation of polyester of 3,3'-thiodipropionic acid and 1,4-cyclohexanedimethanol that is hydroxy-terminated A mixture of 62.5 g. (0.35 m.) of 3,3'-thiodipropionic acid, 50 g. (0.35 m.) of 1,4-cyclohexanedimethanol, 75 ml. of xylene, and 0.2 ml. of titanium isopropoxide was placed in a two-liter flask. The flask was stirred and heated at 140–150° C. under a nitrogen atmosphere at atmospheric pressure for 7 hours. As the theoretical amount of water of esterification formed it was collected and removed in a Dean-Stark water trap. Five grams of Darco G-60 (carbon black), 5 grams of Filter-Cel, 150 ml. of xylene, and 30 ml. of water were then added and the mixture was heated at reflux for 1 hour at atmospheric pressure. The reaction mixture was filtered through a Buckner funnel containing a Filter-Cel bed.

The low boiling components were then removed from the filtrate by vacuum distillation at 150° C./1 mm. pressure. The molecular weight of the waxy hydroxy-terminated, commonly referred to as "unterminated," product was 1839. The acid number was 0.22.

EXAMPLE 18

Preparation of polyester of 3,3'-thiodipropionic acid and 1,3-cyclohexanedimethanol (i.e. hydroxy-termination)

Using the procedure described in Example 17, a polyester was prepared from 62.5 g. (0.35 m.) of 3,3'-thiodipropionic acid, 50 g. (0.35 m.) of 1,3-cyclohexanedimethanol, 75 ml. of xylene and 0.2 ml. of titanium isopropoxide. The white waxy hydroxy terminated or "unterminated" product had a molecular weight of 1720 and an acid number of 0.27.

EXAMPLE 19

Preparation of polyester of 3,3'-thiodipropionic acid and 1,4-cyclohexanedimethanol (i.e., acyloxy-terminated using a monofunctional acid or ester)

A mixture of 89 g. (0.5 m.) of 3,3'-thiodipropionic acid, 85 g. (0.6 m.) of 1,4-cyclohexanedimethanol, 75 ml. of xylene and 0.3 ml. of titanium isopropoxide was placed in a two-liter flask and heated under nitrogen at 145–150° C. for 8 hours. During this time the reaction mixture was stirred and the water evolved was removed with a water separator. To this product was then added 42 g. (0.2 m.) of lauric acid and heating at 145–150° C. was continued for an additional 8 hours. The product was isolated as in Example 17.

This acyloxy terminated waxy grey solid product had a molecular weight of 2137 and an acid number of 2.7.

In place of the lauric acid an equivalent amount of a laurate ester such as methyl, ethyl, octyl, 2-ethylhexyl phenyl, and similar esters may be used to produce suitable products that are at least partially terminated with an acyloxy group derived from a monofunctional ester. For best results, the heating or boiling of the alcohol compounds of these esters should be performed at less than about 195° C.

EXAMPLE 20

Preparation of polyester of 3,3'-thiodipropionic acid and 1,4-cyclohexanedimethanol (i.e., acyloxy-terminated using an anhydride of a monofunctional acid)

A hydroxy-terminated polyester was prepared from 89 g. (0.5 m.) of 3,3'-thiodipropionic acid, 85 g. (0.6 m.) of 1,4-cyclohexanedimethanol, 75 ml. of xylene, 0.2 ml. of titanium isopropoxide, and 20 g. (0.2 m.) of acetic anhydride following the procedure given in Example 17 except that the mixture was heated for an additional 1 hour. The partially acyloxy-terminated product was isolated as a waxy grey solid having a molecular weight 2080 and an acid number of 1.1.

As will be appreciated, various polyesters prepared from 3,3'-thiodipropionic acid and 1,1-cyclohexanedimethylene, 1,2-cyclohexanedimethylene, 2-butyl-2-ethyl-1,3-propanediol, 2-ethyl-2-methyl-1,3-propanediol, or the like can be treated in the manner described above to give either unterminated and/or partially terminated polyesters.

Data is presented in the following table which shows the effectiveness of unterminated or partially terminated polyesters as stabilizers in polypropylene. The solid polypropylene resin had a melt flow index of 5 and an I.V. of 1.7. The various test samples were prepared by mixing the polypropylene resin and the additives in a Midget Banbury mixer for 7 minutes after which the blend was sheeted, cooled, granulated and then molded into 5-mil thick film for stability testing. All percents are by weight.

TABLE II

| Test: | | 160° C. oven life [1] of 5 mil film in hrs. |
|---|---|---|
| 1 | Polypropylene (Control) | 0.5 |
| 2 | PP plus 0.3% dilauryl 3,3'-thiodipropionate (DLTDP). | 1 |
| 3 | PP plus 0.3% Example 17 polyester | 3 |
| 4 | PP plus 0.3% Example 18 polyester | 3 |
| 5 | PP plus 0.3% Example 19 polyester | 2 |
| 6 | PP plus 0.3% Example 20 polyester | 2 |
| 7 | PP plus 0.1% 2,6-bis (1-methylheptadecyl)-p-cresol (BMHPC). | 3 |
| 8 | PP plus 0.1% BMHPC plus 0.3% DLTDP | 42 |
| 9 | PP plus 0.1% BMHPC plus 0.3% Example 17 polyester. | 71 |
| 10 | PP plus 0.1% BMHPC plus 0.3% Example 18 polyester. | 65 |
| 11 | PP plus 0.1% BMHPC plus 0.3% Example 19 polyester. | 60 |
| 12 | PP plus 0.1% BMHPC plus 0.3% Example 20 polyester. | 67 |
| 13 | PP plus 0.1% tetrakis[methylene(3,5-di-tert-butyl-4-hydroxyhydrocinnamate)]-methane plus 0.3% Example 17 polyester. | 76 |
| 14 | PP plus 0.1% octadecyl 3,5-di-tert-butyl-4-hydroxy-hydrocinnamate plus 0.3% Example 17 polyester. | 66 |
| 15 | PP plus 0.1% 1,3,5-trimethyl-2,4,6-tris(3',5'-di-tert-butyl-4'-hydroxylbenzyl)benzene plus 0.3% Example 17 polyester. | 70 |

[1] Time in hours that the film aged before development of embrittlement.

Although the invention has been described in considerable detail with particular reference to certain preferred embodiments thereof, variations and modifications can be effected within the spirit and scope of the invention described hereinbefore.

We claim:
1. A polyester having its molecular chains essentially derived from 3,3'-thiodipropionic acid and a glycol having the formula HO—R—OH wherein R is selected from the group of divalent radicals consisting of 1,1-cyclohexanedimethylene; 1,2-cyclohexanedimethylene; 1,3-cyclohexanedimethylene; and 1,4-cyclohexanedimethylene; said polyester having an average molecular weight of from about 500 to about 4000.

2. A polyester as defined by claim 1, said polyester being at least partially chain-terminated with a compound which is
   (A) an acid selected from the group consisting of acetic acid, butyric acid, isobutyric acid, lauric acid, oleic acid, stearic acid, pelargonic acid and benzoic acid; or
   (B) an anhydride selected from the group consisting of acetic anhydride, butyric anhydride, isobutyric anhydride, lauric anhydride, oleic anhydride, stearic anhyride, pelargonic anhydride, and benzoic anhydride.

3. Polyester of claim 1 wherein the glycol is 1,4-cyclohexanedimethanol.

4. Polyester of claim 3 having a molecular weight of about 767.

5. Polyester of claim 3 having a molecular weight of about 1839.

6. Polyester of claim 2 wherein the glycol is 1,4-cyclohexanedimethanol.

7. Polyester of claim 6 wherein the chain-terminating compound is lauric acid.

8. Polyester of claim 6 wherein the chain-terminating compound is acetic anhydride.

References Cited

UNITED STATES PATENTS

Re. 24,287   3/1957   Smith   260—481X
2,575,196   11/1951   Smith   260—481

LEWIS GOTTS, Primary Examiner

E. J. GLEIMAN, Assistant Examiner

U.S. Cl. X.R.

99—11, 150A, 163; 252—406; 260—45.7S, 476R, 481R

UNITED STATES PATENT OFFICE
CERTIFICATE OF CORRECTION

Patent No. 3,590,056                    Dated June 29, 1971

Inventor(s) C. E. Tholstrup, A. Bell, and C. J. Kibler

It is certified that error appears in the above-identified patent and that said Letters Patent are hereby corrected as shown below:

Column 1, line 4, "Clarence T. Tholstrup" should read ---Clarence E. Tholstrup---;
Column 2, line 42, "altthough" should read ---although---;
Column 2, line 62, "hyddrocarbons" should read ---hydrocarbons---;
Column 3, Example 1, in the table, the column heading "Pressure, mm. Hg" should read ---Pressure, Mn. Hg.---;
Column 3, Example 1, in the table, last column, the Acid Number for 14 hours, "30.3", should read ---3.30---;
Column 6, line 11, "hydroxy" should read ---hydroxyl---.

Signed and sealed this 28th day of December 1971.

(SEAL)
Attest:

EDWARD M. FLETCHER, JR.
Attesting Officer

ROBERT GOTTSCHALK
Acting Commissioner of Patents